United States Patent
Dornbusch et al.

(10) Patent No.: US 10,252,173 B2
(45) Date of Patent: Apr. 9, 2019

(54) GAME CONTROLLER ADAPTER WITH GAME ACTUATOR MECHANISM AND FUNCTION CONTROL MODULE

(71) Applicant: COLLECTIVE MINDS GAMING CO. LTD., Maple Ridge (CA)

(72) Inventors: Ken Dornbusch, Maple Ridge (CA); Darren Ali, Maple Ridge (CA)

(*) Notice: Subject to any disclaimer, the term of this patent is extended or adjusted under 35 U.S.C. 154(b) by 45 days.

(21) Appl. No.: 15/176,959

(22) Filed: Jun. 8, 2016

(65) Prior Publication Data
US 2017/0001109 A1    Jan. 5, 2017

Related U.S. Application Data

(60) Provisional application No. 62/172,894, filed on Jun. 9, 2015.

(51) Int. Cl.
- A63F 13/00    (2014.01)
- A63F 13/98    (2014.01)
- A63F 13/23    (2014.01)
- A63F 13/24    (2014.01)

(52) U.S. Cl.
CPC ............ *A63F 13/98* (2014.09); *A63F 13/23* (2014.09); *A63F 13/24* (2014.09); *A63F 2300/1025* (2013.01)

(58) Field of Classification Search
CPC .. A63F 2300/1043; A63F 13/24; A63F 13/02; A63F 13/06; A63F 13/98; A63F 13/92; A63F 2300/1025; A63F 13/23; A63F 13/40; A63F 13/08; G05G 2009/0474; G05G 9/047

See application file for complete search history.

(56) References Cited

U.S. PATENT DOCUMENTS

| | | | | |
|---|---|---|---|---|
| 5,896,125 A | * | 4/1999 | Niedzwiecki | A63F 13/02 345/156 |
| 6,811,491 B1 | * | 11/2004 | Levenberg | A63F 13/02 273/148 B |
| 2003/0003993 A1 | * | 1/2003 | Leifer | A63F 13/06 463/39 |
| 2004/0023719 A1 | * | 2/2004 | Hussaini | A63F 13/06 463/37 |
| 2004/0180720 A1 | * | 9/2004 | Nashi | A63F 13/06 463/37 |
| 2004/0224768 A1 | * | 11/2004 | Hussaini | A63F 13/24 463/37 |
| 2007/0072680 A1 | * | 3/2007 | Ikeda | A63F 13/06 463/43 |
| 2010/0267454 A1 | * | 10/2010 | Navid | A63F 13/24 463/37 |
| 2012/0244944 A1 | * | 9/2012 | Kotkin | A63F 13/98 463/38 |
| 2012/0302348 A1 | * | 11/2012 | Karacal | A63F 13/837 463/38 |

* cited by examiner

Primary Examiner — Justin Myhr
(74) Attorney, Agent, or Firm — Bennett Jones LLP (57) ABSTRACT

An adapter for use in a video game controller includes a housing having a shape adapted to be securely placed in a compartment or attached to the controller; a console port adapted to interface with a game console for transmitting game information and actions to the game console; a controller port adapted to interface with the controller to receive game functions from the controller; at least one game actuator; and a function control module operatively connected to the console port, the controller port and the at least one game actuator mechanism.

16 Claims, 11 Drawing Sheets

GAME CONTROLLER ADAPTER WITH GAME ACTUATOR MECHANISM AND FUNCTION CONTROL MODULE

FIELD OF THE INVENTION

The present invention relates to an apparatus which attaches to a game controller, and provides game control functionality.

BACKGROUND

Conventional video game play on consoles is controlled by controllers designed to be held in one or both hands of the game player, and which provide buttons, triggers, toggles, switches, touch sensors and other input mechanisms which control or actuate game functions.

Game controllers are typically proprietary to the manufacturer of the game console but share a common form factor. They are generally shaped to fit in both hands of a player, such that controls on the top surface are accessible with the thumb, while controls on the front or side are accessible with the index fingers. It is known to place a control paddle on the underside of the controller, which would allow the player's other fingers, such as the middle fingers, to be used. However, these underside control levers require permanent modification of a game controller, or a complete custom manufacture. As a result, the manufacturer's warranty is typically voided.

SUMMARY OF THE INVENTION

In one aspect, the invention may comprise a video game controller adapter for use in a video game controller having a connection port, the adapter comprising:
(a) a housing having a shape adapted to be securely placed in a compartment or attached to the controller;
(b) a console port adapted to interface with a game console for transmitting game information and actions to the game console;
(c) a controller port adapted to interface with the controller to receive game functions from the controller;
(d) at least one game actuator; and
(d) a function control module operatively connected to the console port, the controller port and the at least one game actuator mechanism.

Preferably, the adapter fits securely within a battery compartment of the controller. Alternatively, the adapter may attach to and fit against the controller.

In one embodiment, the at least one game actuator mechanism comprises at least one, and preferably two, levers which extend along the underside of the controller when the adapter is installed or attached. In one embodiment, the levers may comprise a first elongate portion, a second transverse portion, and a third tip portion.

In one embodiment, the function control module is user-programmable such that the function of the at least one game actuator may be selected from a plurality of different functions at the player's choice.

The adapter does not require any modification of a controller, apart from its installation and connection. It is configured to pass through controller game functions to the console unaltered, and/or to intercept and redesignate game functions into alternate functions or actions which are then sent to the console.

In another aspect, the invention may comprise a method of adding a game control actuation mechanism to a game controller, comprising the steps of:
(a) attaching an adapter to a game controller in a non-permanent manner, wherein the adapter comprises a console port adapted to interface with a game console for transmitting game information and actions to the game console, a controller port adapted to interface with the controller to receive game functions from the controller, at least one game actuator mechanism, and a function control module operatively connected to the console port, the controller port and the at least one game actuator mechanism;
(b) establishing a connection between the controller and the function control module; and
(c) establishing a connection between the function control module and the game console.

The method may comprise the further step of selecting a game function to assign to the at least one game actuator mechanism, which game function may comprise a standard game function, a customized game function, or a combination of game functions.

BRIEF DESCRIPTION OF THE DRAWINGS

The following drawings form part of the specification and are included to further demonstrate certain embodiments or various aspects of the invention. In some instances, embodiments of the invention can be best understood by referring to the accompanying drawings in combination with the detailed description presented herein. The description and accompanying drawings may highlight a certain specific example, or a certain aspect of the invention. However, one skilled in the art will understand that portions of the example or aspect may be used in combination with other examples or aspects of the invention.

DETAILED DESCRIPTION

As used herein, the recited terms have the following meanings. All other terms and phrases used in this specification have their ordinary meanings as one of skill in the art would understand.

Generally, the present invention comprises a video game controller adapter (10) for use with a handheld video game controller (30). The adapter is configured to connect to both the controller (30) and the game console (40) so as to pass through conventional game command functions to the game console, and comprises at least one game actuator mechanism which can either replicate an existing game function or provides a custom game function to be added to the controller. The at least one game actuator mechanism may be programmable so that the user may select or create the game control provided by the adapter. This additional functionality may thus be added to controller (30) without permanently modifying the controller itself. In one embodiment, the adapter is configured to fit into and be secured within the battery compartment of an existing controller. In alternative embodiments, the adapter is configured to attach to the exterior of an existing controller. In either case, no permanent modification is made. In other words, the controller case is not opened or cut, and the internal components of the controller are not modified or connected to. Upon removal of the adapter, the controller is exactly as it was before.

Figure 1:
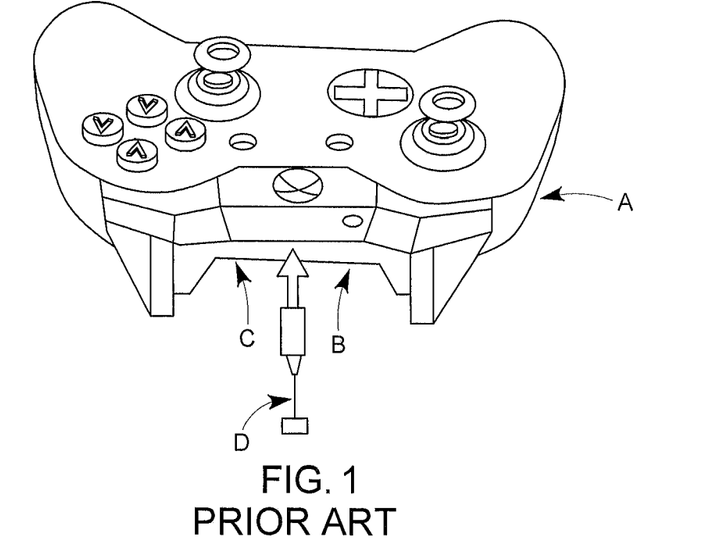
FIG. 1 shows a prior art conventional controller for an Xbox™ video game console.

A conventional Xbox One™ controller (A) is shown in FIG. 1. As may be seen, a removeable battery (B) pack is held within a battery compartment (C) on the underside of the controller. An Xbox One controller may be used wirelessly, so that the battery is the power source, or the controller may be connected by a cable (D) to the game console (not shown), which cable transmits game command information from the controller to the game console and also provides power to the controller from the game console, in which case the battery is not necessary.

The adapter (10) of the present invention may be used with a controller (30) having an accessible compartment such as a battery compartment, and a connection port (32) for physically connecting to a game console (40), the adapter comprising:

(a) a housing (11) having a shape configured to be securely placed in the compartment;

(b) a console port (12) adapted to connect a cable (13) to a game console for transmitting game information and actions to the game console and to receive power from the game console;

(c) a controller port (14) for connecting a cable (15) to the controller connection port (32); and (d) a function control module (16) operatively connected to at least one game function lever (18).

wherein the control module (16) is operatively connected to the console port (12) to transmit adapter game functions to the game console. Game function commands from the controller (30) itself may pass through the adapter unaltered, and are sent to the game console (40) via port (12).

In alternative embodiments, the console port which provides a connection to the game console may comprise a wireless configuration, such as a Bluetooth™ module or a module implementing any other short range wireless protocol.

Figure 2:
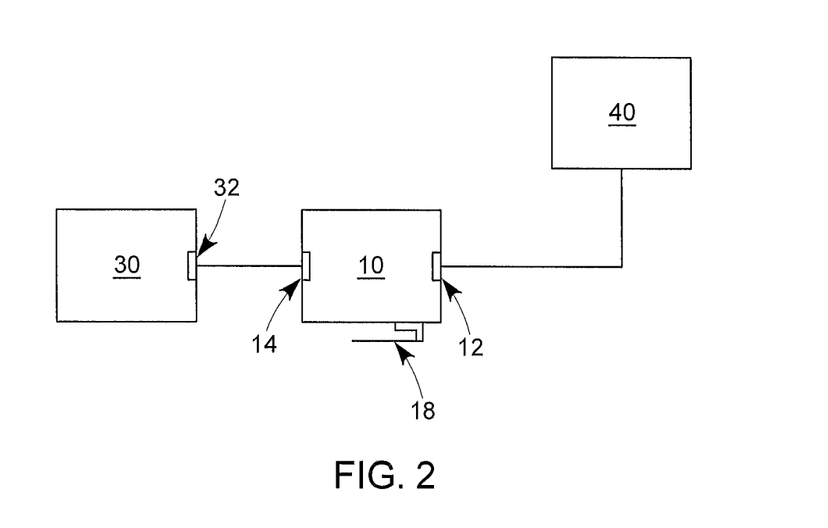
FIG. 2 is a schematic block diagram showing one embodiment of an adapter of the present invention connected to a video game console and a controller.
Figure 3:
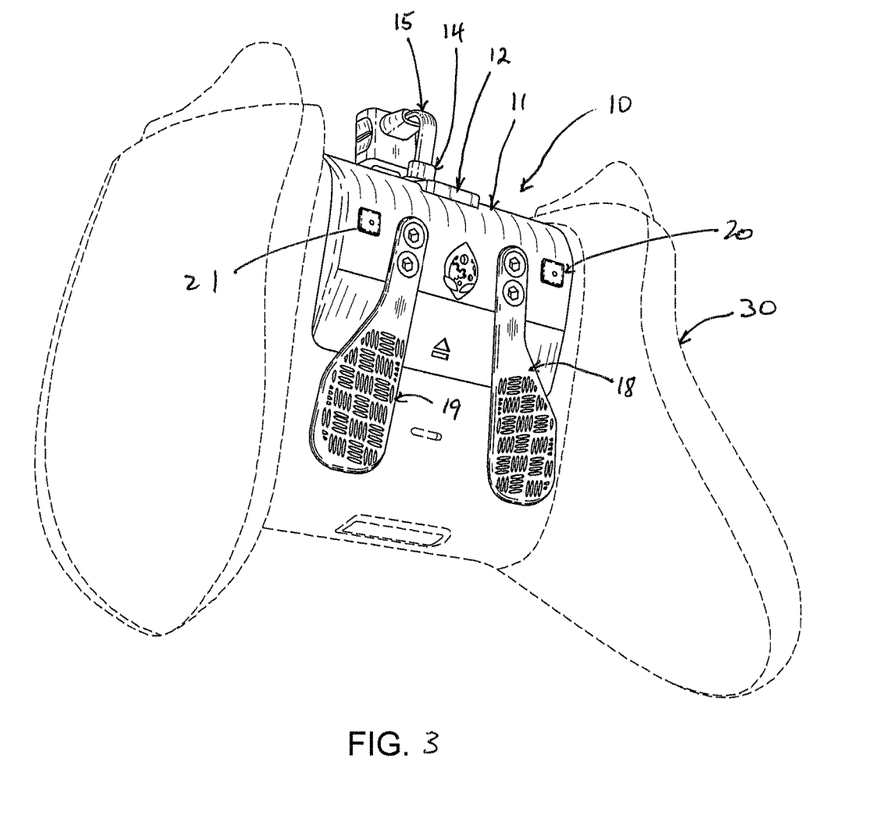
FIG. 3 is a view of one embodiment of an adapter, installed into the battery compartment of the controller shown in FIG. 1.
Figure 4:
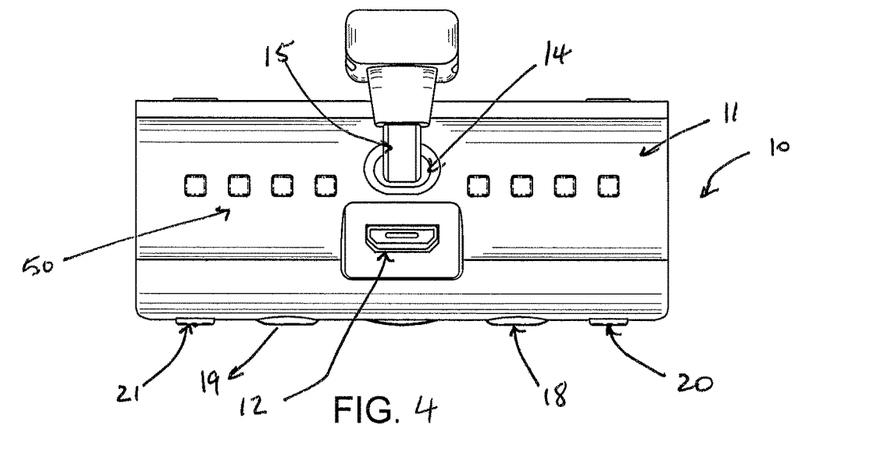
FIG. 4 is a front view of the adapter of FIG. 3.

In one embodiment, the at least one game actuator mechanism comprises at least one, and preferably two, levers (18, 19). As shown in FIG. 2, both levers extend from the adapter housing such that they extend along the underside of the controller when the adapter is installed into the controller. The physical actuation of the lever is contained within the adapter itself, so that no modification of the controller is required. In one embodiment, pressing the lever (18, 19) activates a contact switch (22) disposed on the adapter underneath the lever. If there are two levers, the adapter may comprise two control functions.

Figure 5:
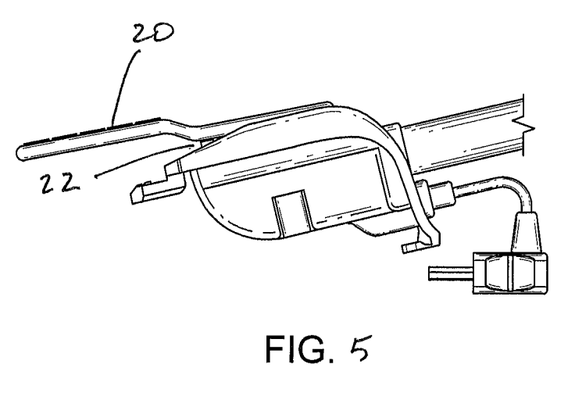
FIG. 5 is a side view of the adapter of FIG. 3.

The levers (18, 19) themselves may take any shape or configuration. For example, in one embodiment, the levers are straight and have a relatively broad surface for contact by the user's finger. The contact surface may be textured to help prevent slippage. In an alternative embodiment, the lever may have a slight curve or double bend, as shown in FIG. 5, so as to increase its separation from the controller (30) body when the adapter (10) is installed.

Figure 6:
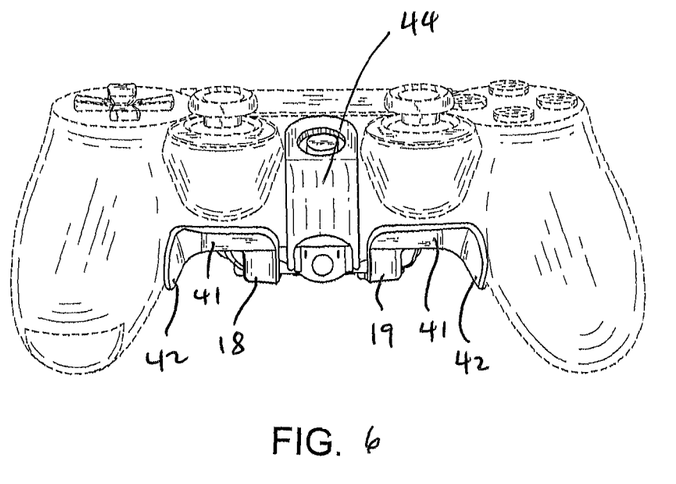
FIG. 6 is a front view of a different, alternative adapter, shown installed on a PlayStation® video game controller in dashed lines.
Figure 7:
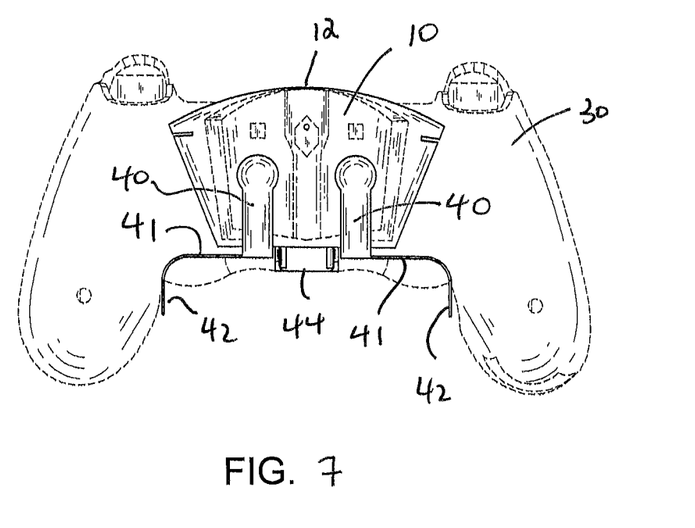
FIG. 7 is a bottom view of the adapter of FIG. 6.
Figure 8:
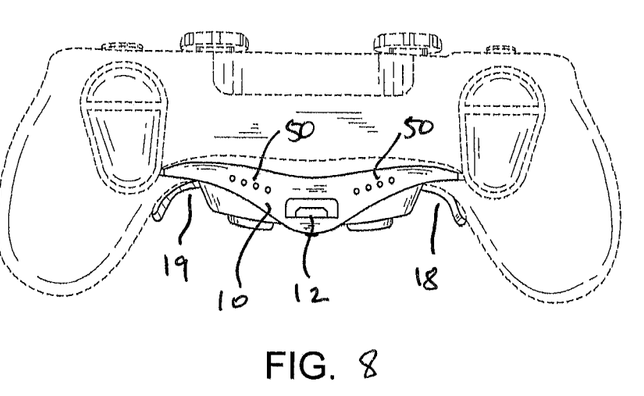
FIG. 8 is a rear view of the adapter of FIGS. 6 and 7.

In an alternative embodiment, the adapter may be configured to attach to a controller, which may or may not have an accessible battery compartment, such as a Playstation™ (PS3 or PS4) controller (30) is shown in FIGS. 6, 7 and 8. Connections to the controller and game console may be as described above, and the adapter functionality may be similar or identical.

As shown in FIGS. 6-8, in one embodiment, the levers (18, 19) may be adapted to the particular shape of a PS4 controller. In one embodiment, each lever comprises a first elongate section (40) which extends backwards substantially horizontally, a transverse section (41) where the lever extends outwardly and with a vertical planar orientation, and a tip section (42) where the lever extends rearwardly again but with a vertical planar orientation, as opposed to the horizontal planar orientation of the first elongate section (40).

The adapter is retained in position at the rear end by clip (44) which extends around the controller. The front end may be retained in position by insertion of a USB plug into the controller USB port (not shown), which provides the port for connection to the controller.

The adapter comprises a function control module (16) which is configured to replicate an existing or conventional game function when a lever (18 or 19) is activated. Therefore, two game control functions which are conventionally activated by a thumb or index finger control may be replicated to the levers on the underside of the controller. Alternatively, the control module (16) may be configured such that lever activation causes a custom game function or combination of functions to be sent to the game console.

In one embodiment, the functional control module (16) is configured to allow programming of the lever functions with the adapter (10) itself. A simple programming procedure may be used, such as the use of programming buttons (20, 21) which activates the programming function. In one procedure, the user depresses and holds the left or right programming button (20 or 21) while selecting the game controller button which function is to be assigned to the left or right lever, as the case may be. Upon release, that game function will have been assigned to that lever. Any conventional game function may be assigned to the lever in this manner. Alternatively, the function control module may be programmed such that the lever actuated function causes a combination of game functions to be sent to the controller, essentially simultaneously.

In another embodiment, the function control module (16) is programmable such that the lever actuated function may be selected from a plurality of different pre-programmed functions, or combination of functions, at the player's choice. The pre-programmed functions may be stored in a memory in the adapter and selected using a selection procedure utilizing the programming buttons (20, 21) and the lever switches (18, 19).

Alternatively, the adapter may be operatively connected, for example by USB connection, to a personal computer (not shown) which may operate a software program to select, upload or otherwise configure programmed selections in the adapter (10).

A bank of indicator lights (50) may be provided which visually indicate which programming option has been selected. For example, the game function of each of the left and right levers may each be chosen from eight different pre-programmed combination of game functions. A bank of eight indicator lights will visually show which program has been selected and is operative.

The game functions may be conventional game functions which are available with the unmodified game controller, or may be modified game functions developed and used by skilled game players at high levels.

Figure 9A:
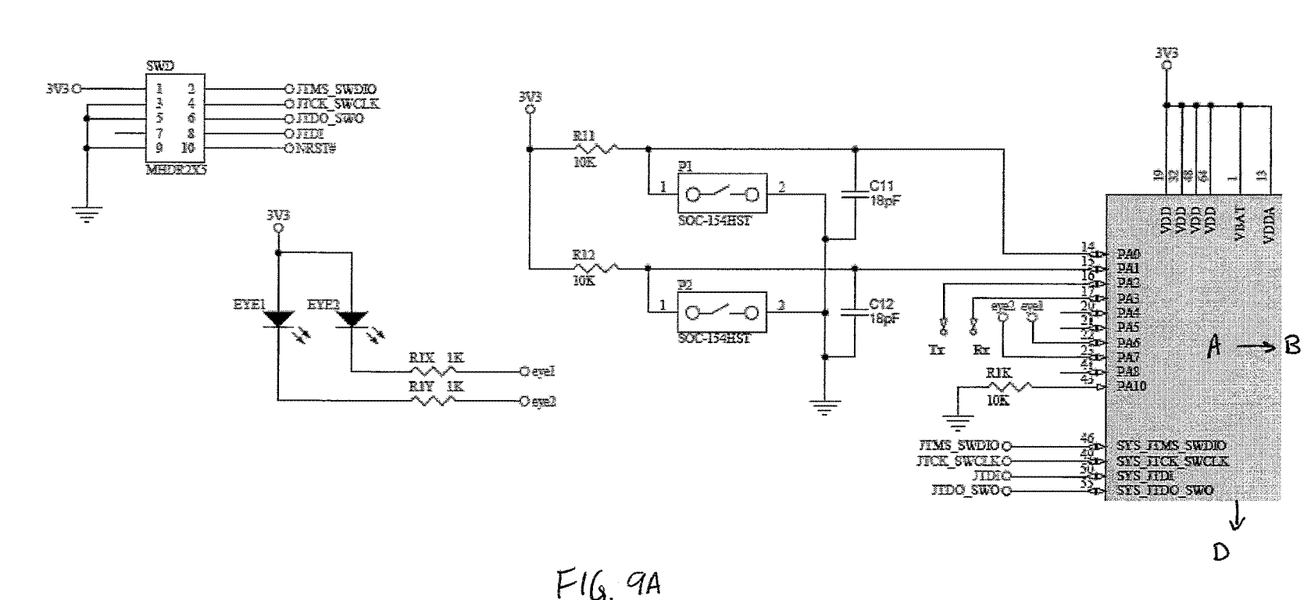
FIGS. 9A-D together shows a schematic diagram of one embodiment of a function control module.
Figure 9B:
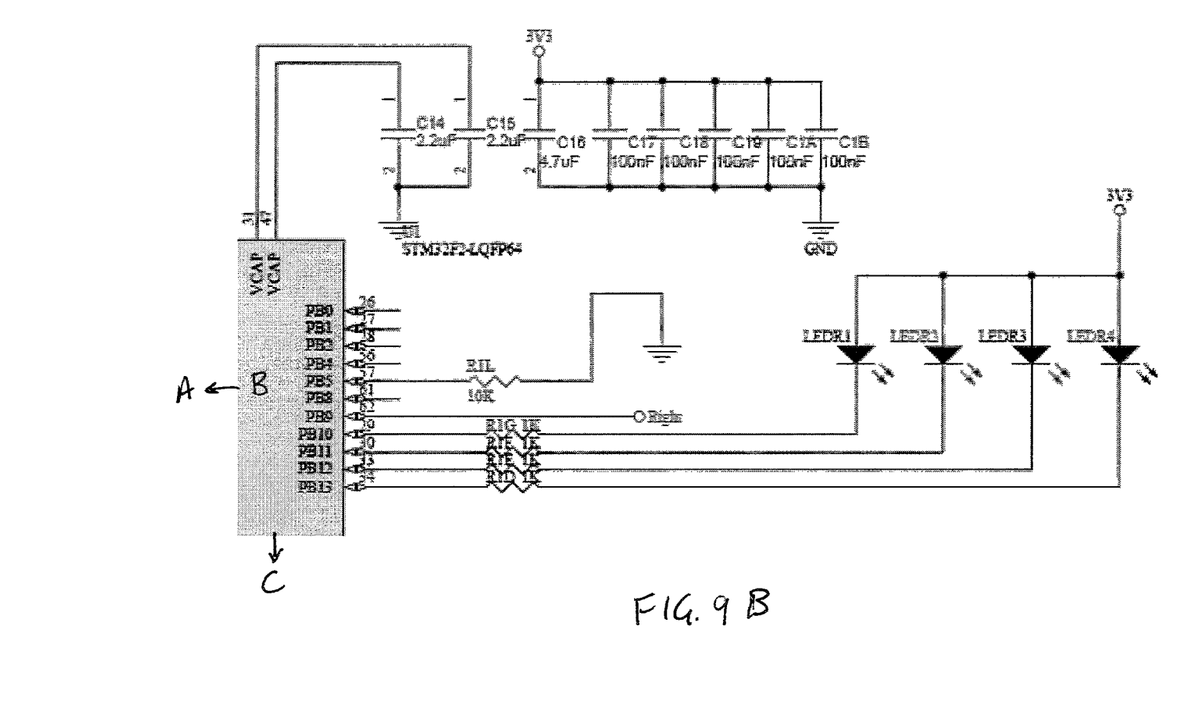
Figure 9C:
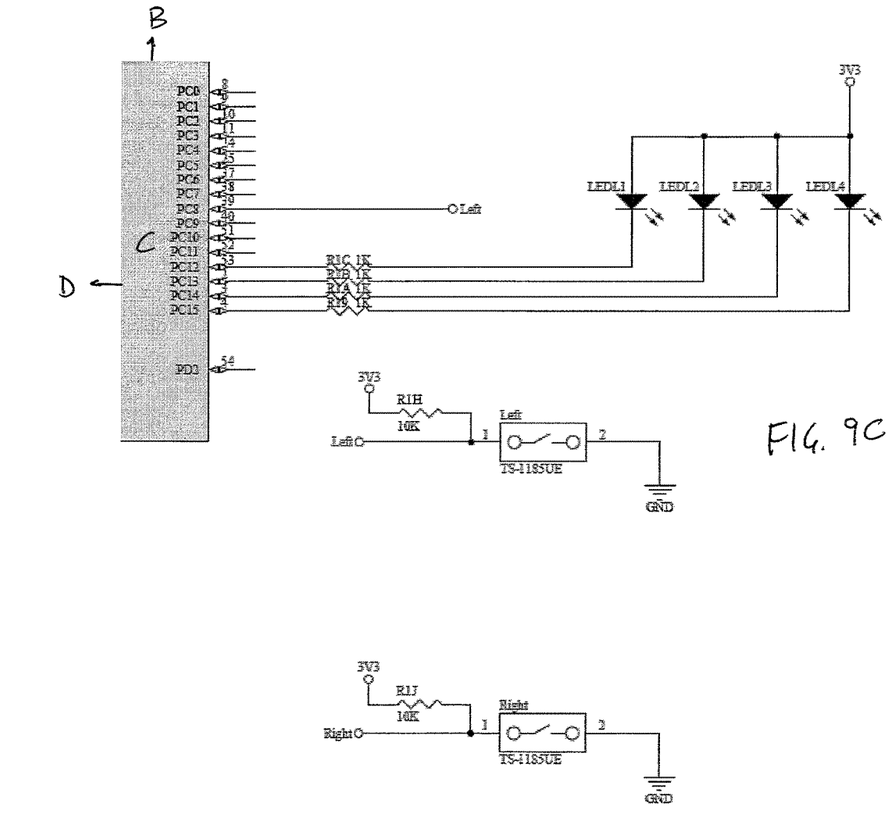
Figure 9D:
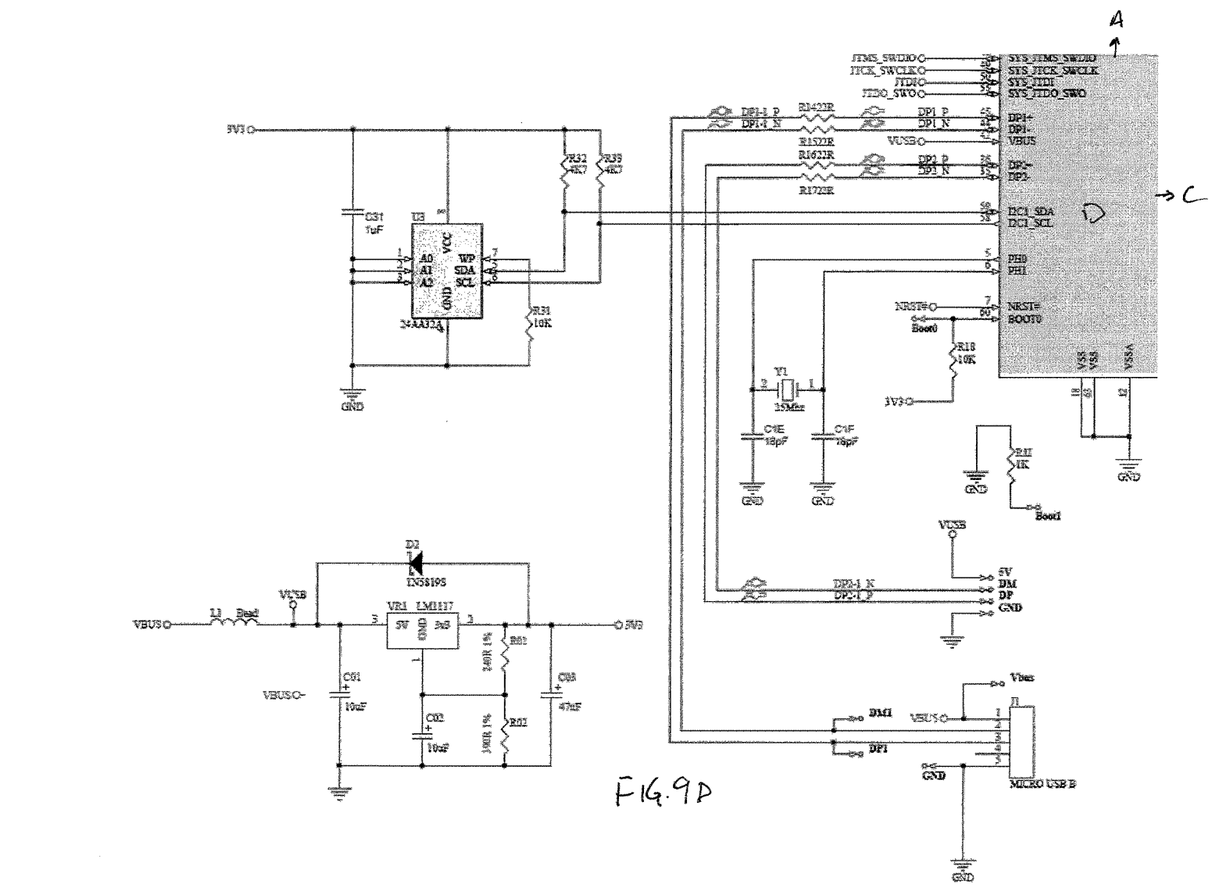

One exemplary implementation of a game function module (16) is shown in FIGS. 9A, B, C and D, using electronic terminology and symbols well known to those of skill in the art, which is intended to illustrate a specific embodiment of the present invention, and not be limiting of the claimed invention, unless specifically recited as a claim limitation.

Definitions and Interpretation

The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. Embodiments were chosen and described in order to best explain the principles of the invention and the practical application, and to enable others of ordinary skill in the art to understand the invention for various embodiments with various modifications as are suited to the particular use contemplated.

The corresponding structures, materials, acts, and equivalents of all means or steps plus function elements in the claims appended to this specification are intended to include any structure, material, or act for performing the function in combination with other claimed elements as specifically claimed.

References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such aspect, feature, structure, or characteristic with other embodiments, whether or not explicitly described. In other words, any element or feature may be combined with any other element or feature in different embodiments, unless there is an obvious or inherent incompatibility between the two, or it is specifically excluded.

It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition or step being referred to is an optional (not required) feature of the invention.

The singular forms "a," "an," and "the" include the plural reference unless the context clearly dictates otherwise. The term "and/or" means any one of the items, any combination of the items, or all of the items with which this term is associated. The phrase "one or more" is readily understood by one of skill in the art, particularly when read in context of its usage.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A video game controller adapter for use in a video game controller and a connection port, the adapter comprising:
    (a) a housing having a shape adapted to be securely placed in a controller compartment or attached to the controller;
    (b) a console port adapted to interface with a game console for transmitting game information and actions to the game console;
    (c) a controller port adapted to interface with the controller to receive game functions from the controller;
    (d) at least one game actuator mechanism; and
    (e) a function control module operatively connected to the console port, the controller port and the at least one game actuator mechanism, and configured to, in response to actuation of the game actuator mechanism, transmit a game function assigned to the game actuator mechanism to the game console via the console port.

2. The adapter of claim 1 wherein the at least one game actuator mechanism comprises at least one lever which extends along an underside of the controller when the adapter is installed in the compartment or attached to the controller.

3. The adapter of claim 2 wherein the at least one lever comprises a left lever switch and a right lever switch.

4. The adapter of claim 3, the function control module is configured to be programmable by a user to assign a selected game function or functions to each of the left and right lever switches.

5. The adapter of claim 4 wherein the game function is a standard game function, a customized game function, or a combination of game functions.

6. The adapter of claim 4 wherein the function control module comprises a memory component adapted to store programmed selections or combinations of game functions which may be assigned to each lever switch.

7. The adapter of claim 4 comprising a visual indicator which displays a signal indicative of the programming selection.

8. The adapter of claim 7 wherein the visual indicator comprises a bank of lights, wherein each light is indicative of a different programming selection.

9. The adapter of claim 8 comprising two banks of lights, each bank associated with one of the left or right lever switches.

10. The adapter of claim 4, wherein the adapter further comprises a left programming button and a right programming button, wherein the function control module is configured to assign a first game function associated with a first game controller button to the left lever switch when the user depresses and holds the left programming button while depressing the first game controller button and then releases the left programming button and the first game controller button, and wherein the function control module is configured to assign a second game function associated with a second game controller button to the right lever switch when the user depresses and holds the right programming button while depressing the second game controller button and then releases the right programming button and the second game controller button.

11. The adapter of claim 1 further comprising a clip adapted to attach the adapter to the controller.

12. A method of adding a game control actuation mechanism to a game controller, comprising the steps of:
   (a) attaching an adapter to a game controller in a non-permanent manner, wherein the adapter comprises a console port adapted to interface with a game console for transmitting game information and actions to the game console, a controller port adapted to interface with the controller to receive game functions from the controller, at least one game actuator mechanism, and a function control module operatively connected to the console port, the controller port and the at least one game actuator mechanism, and configured to, in response to actuation of the game actuator mechanism, transmit a game function assigned to the game actuator mechanism via the console port to the game console;
   (b) establishing a connection between the controller and the function control module; and
   (c) establishing a connection between the function control module and the game console.

13. The method of claim 12 comprising the further step of selecting a game function to assign to the at least one game actuator mechanism, which game function may comprise a standard game function, a customized game function, or a combination of game functions.

14. The method of claim 12 wherein the adapter is attached to the controller by insertion into a battery compartment.

15. The method of claim 12 wherein the adapter is attached to an exterior of the controller by means of a clip.

16. The method of claim 13, wherein the adapter further comprises a programming button, wherein the function control module is configured to assign a standard game function associated with a game controller button to the game actuator mechanism when the user depresses and holds the programming button while depressing the game controller button and then releases the programming button and the game controller button.

\* \* \* \* \*